Oct. 31, 1933.    W. GREENBERG    1,932,965
NUMBER INDICATOR AND REGISTER FOR AUTOMATIC TELEPHONES
Filed July 21, 1931    2 Sheets-Sheet 1
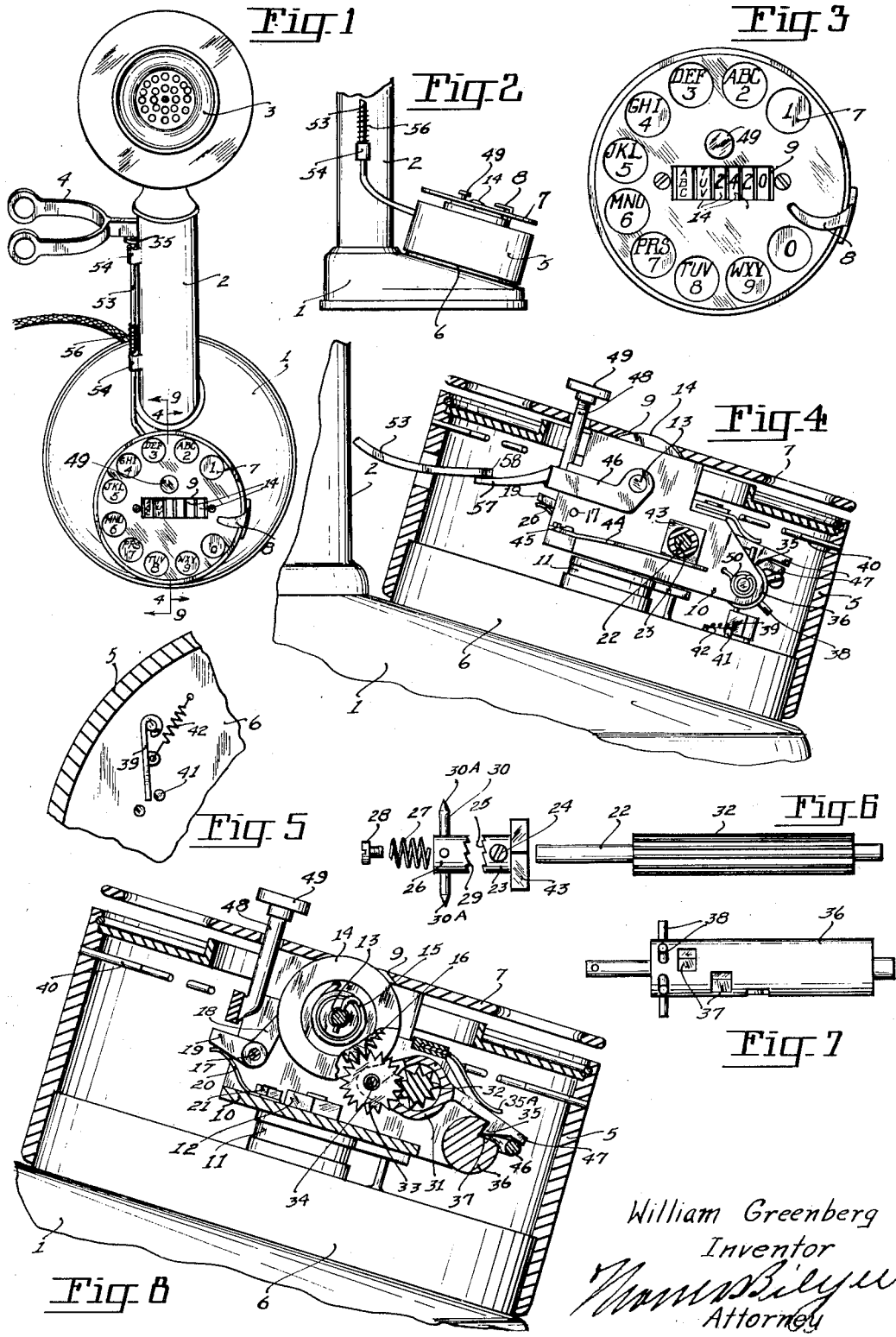
William Greenberg
Inventor
Attorney

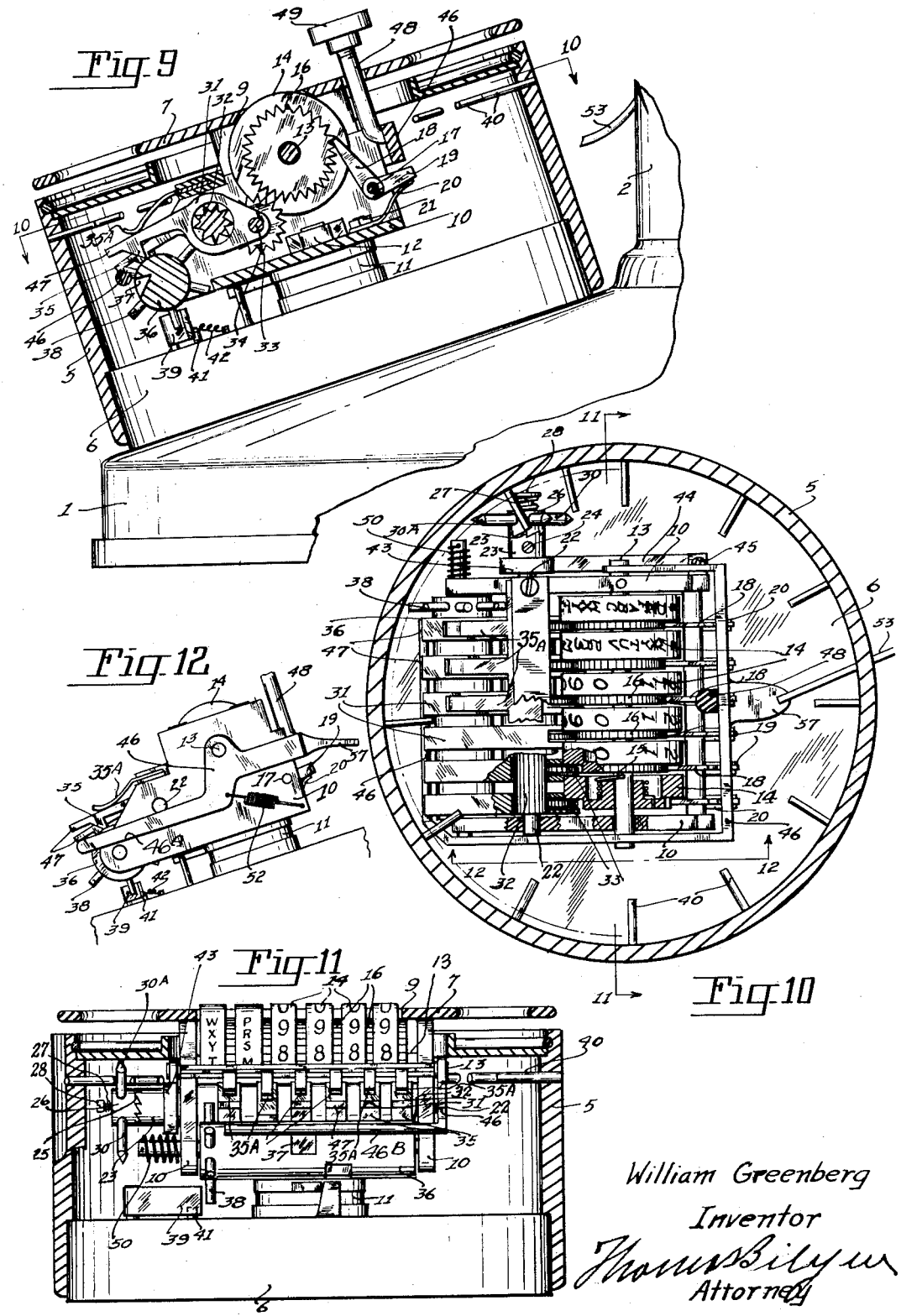
Oct. 31, 1933.  W. GREENBERG  1,932,965
NUMBER INDICATOR AND REGISTER FOR AUTOMATIC TELEPHONES
Filed July 21, 1931  2 Sheets-Sheet 2
William Greenberg
Inventor
Attorney Patented Oct. 31, 1933

1,932,965

UNITED STATES PATENT OFFICE 1,932,965

NUMBER INDICATOR AND REGISTER FOR AUTOMATIC TELEPHONES

William Greenberg, Portland, Oreg.

Application July 21, 1931. Serial No. 552,139

20 Claims. (Cl. 179—90)

This invention relates generally to devices for registering and/or indicating indicia which are intended to set up electrical or mechanical impulses between two or more points or stations. The invention in its broader scope may be used in conjunction with any impulse transmitting devices and, particularly, with the type of impulse transmitting devices in which automatic switches operatively respond to interruptions of a metallic circuit in order to transmit a series of impulses progressively or otherwise.

The important object of my invention is to visibly indicate and/or register the indicia which represent the series of impulses which are set up by the impulse transmitting device to which my invention is applied and, when desired, to remove the indicia indicated and/or registered.

Another object of my invention is to provide means which will automatically and progressively bring into view the indicia, such as call numbers, being transmitted over an impulse transmitting device and also to provide means for removing the indicia either at the end of each cycle of operation or before the beginning of the next cycle of operation.

A very important object of my invention is to provide means for indicating to the operator of the mechanism the indicia which he is seeking to transmit as it is being transmitted by electrical impulses or otherwise and, further, to maintain said indicia in full view before him until the beginning of a new operation or until immediately after the completion of the operation.

Another object of my invention is to provide an indicia and/or register that is compactly arranged and adapted to be easily attached to or made an integral part of any impulse transmitting device without detracting from the appearance of said device or which may be used independently, if desired, said mechanism being efficient, comparatively cheap, and easy to operate.

For the purpose of more graphically showing the application of my invention to impulse transmitting devices, I have illustrated and embodied my invention in connection with an automatic telephone. The general and detailed description of my invention, therefore, will be based upon such embodiment. However, I do not wish to be limited in the application of my device to telephonic service, as it may be used in conjunction with any instrument used for recording indicia or other means of transmitting intelligence whether by transmitting electric impulses or not. I, therefore, do not wish to be limited to the application of my invention to electrically operated devices, as it is equally applicable to mechanically operated devices.

It is well to note that as the present automatic telephone is constructed, it is impossible to determine whether or not the individual who is dialing a number is dialing the correct letters and/or numerals during the dialing operation. It often happens that a wrong number is dialed unintentionally. By the use of my invention, such occurrences cannot happen since the individual who is dialing can observe what he has dialed and thereby he is able to detect any error he might make while dialing. Sometimes an individual dials the correct number but finds the line busy. With the present type of telephone he must remember the telephone number until he tries to dial again. However, by the use of my invention, the number previously dialed remains recorded until he desires to call it again. It is evident, therefore, that the efficiency of the operation of telephones is increased without materially altering their construction and the telephone user is materially aided.

The invention consists primarily of an assembled unit adapted for coacting with an impulse transmitting device, such as an automatic telephone, and automatically indicates and/or registers the telephone number dialed on an automatic telephone as the number is dialed. The assembled unit has means which are adapted for releasing and returning to normal, inactive position, the elements carrying the letters and/or numerals comprising the telephone number at the completion of each dialing cycle.

In applying the invention to automatic telephones, each letter and/or numeral of the number being dialed is indicated and can be seen through an opening disposed through the casing of the mechanism. Means are provided for releasing the letter and/or numeral indicated and/or registered by the mechanism upon the completion of each cycle of operation or at the beginning of the next cycle of operation.

A further object of my invention is to provide means for attaching the mechanism embodying my invention to the dialing shaft of an automatic telephone, means for automatically indicating and registering the telephone number dialed or being dialed, and selective means automatically releasing the dialed number upon the completion of the dialing cycle, or at the beginning of the next dialing cycle.

A still further object of my invention is to provide means whereby the mechanism embodying my invention is operated by power transmitted thereto during the dialing operation from the dial and, further, to provide a plurality of release mechanisms for returning the indicating and registering elements to their normal dormant position either at the completion of a dialing cycle or at the beginning of a dialing cycle or at any time.

The invention is directed to other objects and possesses other features of novelty and advantage and consists in the new and useful provision, formation, construction, combination and interrelation of parts, members and features, all of which will become more apparent from the following detailed description, having reference to the accompanying drawings which illustrate but one embodiment by which the invention may be realized and which is shown in conjunction with an automatic telephone of the present construction merely for more graphically setting forth the application of the invention, and in which:

Figure 1 is a perspective, plan view of an automatic telephone having associated therewith one of my indicia indicating and registering units, showing a top view of the mechanism and showing the position of one of the release elements relative to the telephone and to the mechanism. Some of the indicia already dialed is also shown.

Figure 2 is a fragmentary, side view of an automatic telephone illustrating the position of the indicia indicating and registering mechanism relative to the base of the telephone.

Figure 3 is a top view of the automatic telephone dial face illustrating the manner of visually indicating and registering the indicia representing the number that has already been dialed.

Figure 4 is a fragmentary, side view, partially in section, illustrating in part, some of the elements used in the indicia indicating and registering mechanism and showing the manner of attaching the said mechanism to the base of an automatic telephone, the view being taken on line 4—4 of Figure 1, looking in the direction indicated.

Figure 5 is a fragmentary, top view, partially in section, showing a tripping pawl which is a part of the indicia indicating and registering mechanism.

Figure 6 is a plan view of a part of the pinion assembly, the parts of which are shown in spaced relationship and ready to be assembled. The said pinion assembly is shown removed from the indicia indicating and registering mechanism.

Figure 7 is a plan view of a selector containing a plurality of locking surfaces and selective pins used in connection with the indicia indicating and registering mechanism.

Figure 8 is a fragmentary, side view, partially in section, illustrating, in part, some of the elements used in the indicia indicating and registering mechanism and showing a part of the pinion assembly enmesh with some of the indicia holding elements.

Figure 9 is a fragmentary, sectional, side view, partially in section, illustrating, in part, some of the elements used in the indicia indicating and registering mechanism and showing the manner of attaching the said mechanism to the dial shaft of an automatic telephone, the view being taken on line 9—9 of Figure 11 looking in the direction indicated.

Figure 10 is a sectional, top view, portions being broken away to more graphically show some of the elements, of the indicia indicating and registering mechanism showing the relationship of the mechanism to its housing, the view being taken on line 10—10 of Figure 9 looking in the direction indicated.

Figure 11 is a sectional, front view of the indicia indicating and registering mechanism, a portion of which is broken away, illustrating the position, relative to each other, of the various elements comprising the mechanism, the view being taken on line 11—11 of Figure 11 looking in the direction indicated.

Figure 12 is a side view of that portion of the indicia indicating and registering mechanism which is secured to the dial shaft of an automatic telephone, the view being taken on line 12—12 of Figure 10 looking in the direction indicated.

Like reference characters refer to corresponding parts throughout the several views.

There is shown in Figure 1 an automatic telephone, commonly known as the "American" type of automatic telephone, having associated therewith one of my indicia indicating and registering units. This disclosure, however, is not to be taken as a limitation of my invention to automatic telephones of this type since my invention is not only applicable to other impulse transmitting devices, but it is also applicable to other types of telephones as for instance those telephones, commonly known as "French" or "European" types of telephones.

Reference character 1 designates the base of an automatic telephone, commonly known as the "American" type. Extending upwardly from the base is column 2 upon which rests transmitter-head 3. Extending outwardly from the side of column 2 is the receiving-hook 4. Reference character 6 designates the base that is normally a part of the base 1 of the automatic telephone illustrated. Housing 5 is placed about base 6 and has attached thereto stop 8 of the well known type. The dial-face 7 is rotatably disposed in spaced relationship to housing 5 and is removably secured to frame 10. Reference character 9 designates the cut out portion of the dial-face 7 through which indicia-carrying-wheels, to be described, may be viewed.

A U-shaped frame 10 is removably secured to the dialing shaft 11 of the telephone by any suitable fastening means as a nut 12. A shaft 13 is journaled within the side walls of the frame 10 and a plurality of indicia carrying wheels 14 are placed upon the shaft 13 and each of the indicator wheels are graduated upon the outer surface in letters, or numerals. Each of the indicator wheels are indirectly secured to the shaft and are normally held in a normal dormant position by reacting elements such as a coil spring 15; each one of which is secured to the shaft 13 and to the inner surface of each of the indicating wheels. A gear-wheel 16 is secured to the side of each of the indicator wheels 14.

A bell crank supporting shaft 17, is also journaled within the side walls of frame 10. A plurality of bell cranks 18 are disposed upon the bell crank supporting shaft 17 and each of them is in registerable alignment with its respective gear-wheel 16. A reacting element such as spring bar 20 is intimately disposed under arm 19 of each bell crank. In this manner the free end of each bell crank is maintained in contact with its gear wheel 16 and they are released by mechanism hereinafter to be fully described. Spring bars 20 are secured to the base of the frame 10 by suitable fastening means as screws 21.

A shaft 22, shown enlarged in Fig. 6, is journaled within the side walls of frame 10. The shaft 22 has an elongated gear wheel 32 disposed thereon and a hub 23 is removably secured thereto through the use of a set screw 24. A ratchet face 25 is disposed within one end of the hub 23 and square surface 43 is disposed on the other end of the hub and is adapted to be rotated relative thereto. A reacting element, as a coil spring 27, is disposed upon the outer end of the shaft 22 and is at all times held in contact with the sleeve 26 by a screw 28. The screw 28 is adapted for being threadably engaged within the end of the shaft 22. The sleeve 26 also has a ratchet tooth face 29 that is adapted to coact with the ratchet face 25 when the sleeve is rotated in one direction only. In this manner, the two ratchet-faces are maintained at all times in working relationship with each other through the action of the reacting element 27. A plurality of pins 30, having pointed ends 30A, are secured to one end to the sleeve shaft 26 and extend upwardly from the sleeve in spoke-like fashion.

A plurality of yokes 31 are freely mounted upon the elongated gear-wheel 32 and each of the yokes has an idler gear 33 in operating engagement with the surface of the gear 32 at the point of contact with the same, and as the shaft 22 and the gear 32, associated therewith is rotated, the idler gear 33 will also be rotated. Each of the idler gears 33 are normally out of engagement with the gear 16 and the associated recording wheels remain inactive and in the unrecording position until the same has been rotated. The idler gear 33 is carried upon a journal pin 34 that is directly secured to one end of the yoke 31. The oppositely disposed end of the yokes 31 each carries a pawl 35 and free ends 47.

A selector or camming shaft 36 is journaled upon its oppositely disposed ends within the side walls of the frame 10 and locking surfaces or camming notches 37 are formed within the camming shaft. These locking surfaces are spaced apart and are disposed in spiral fashion around the periphery of the selector so that the locking surfaces are in direct alignment with the pawls 35 of the yokes 31. There are as many camming notches disposed within the camming shaft as there are yokes and recording wheels. The selector 36 is positioned relative to the elongated gear wheel 32 and to the yokes 31 so that when any of the pawls 35 drop within any of the camming notches 37 the corresponding yoke is rocked sufficiently to permit the corresponding idler gear 33 to contact with and engage the corresponding gear 16 that is associated with the indicator wheel 14 to be rotated. Each of the pawls 35 is maintained in intimate contact with the periphery of the selector 36 by any suitable means, as spring bars 35A.

A plurality of selective pins 38, outwardly extend from one end of the camming shaft 36 a tripping pawl 39 is hingedly secured to the base 6 of the telephone so that it is disposed in direct alignment with the selective pins 38. As the frame 10 and its associated elements are rotated clockwise, one of the selective pins 38 comes in contact with the surface of the tripping pawl 39 causing the tripping pawl to be pushed away from stip pin 41 and in this manner the rotation of the selector 36 is avoided. When the frame 10 and its associated elements are moved counter clockwise, one of the selective pins 38 comes in contact with the other surface of the tripping pawl 39. Since the free end of the tripping pawl is held against the stop-pin 41, the contacting of the selective pin against the surface of the tripping pawl causes the selector 36 to be rotated sufficiently to permit one of the pawls to enter one of the locking surfaces 37.

A plurality of spaced pins 40 inwardly extend from the housing 5 and these pins are in registerable alignment with the pins 30 that outwardly extend from the sleeve shaft 26. When the frame 10 and its associated elements are rotated clockwise about the dial shaft 11 the pins 30 contact the pins 40 and thereby transmit rotary motion to the elongated wheel 32, because ratchet face 29 of sleeve 26 interlocks with ratchet face 25 of hub 23.

In order to provide the necessary escapement, the selective pins 38 contact the tripping pawl 39 at the beginning of each dialing cycle. A stop pin 41 normally maintains the tripping pawl in placement and is held thereagainst by a reacting element as a coil spring 42. A part of the hub 23 has a square surface 43 under which locking spring 44 is disposed in registerable alignment with the square portion of the hub 43 which precisely positions the shaft and the assembly secured thereto. The spring 44 is secured to the side wall of the frame through the use of a fastening screw 45.

A release yoke 46 is hingedly secured relative to the frame 10 about the shaft 13. The yoke 46 is in direct alignment with arms 19 and passes over each of the bell cranks 18 and under the free ends 47 of each of the yokes 31. A push rod 48 upwardly extends from the yoke 46 and passes through the dial face 7 and terminates in a button 49. A reacting element such as a coil spring 52 normally maintains the release yoke and its associated elements out of engagement with the arms 19 and the free ends 47 respectively. On the completion of each dialing cycle, the button 49 is depressed, which unlatches each of the bell cranks 18 from the gears 16 and the reacting springs 15 return the indicator wheels to normal position. Simultaneously therewith the pawl 35, that is in registerable engagement with the locking surface 37, of the selector 36 is released and the reacting element 50 disposed upon the end of the selector returns the selector to its normal position, at the completion of each dialing cycle.

While I have here shown the yoke 46 as adapted for being manually manipulated at the completion of each dialing cycle, I do not wish to be limited to the operation of the same in this manner as the same may be hitched by suitable mechanisms to the telephone receiving hook and as the telephone receiver is hung upon the hook the dialing cycle may be thus completed, by the unlatching in an obvious manner, or a combination of the mechanisms herein shown and the operation of the yoke through the hanging of the telephone receiver upon the hook may be combined, the doing of either of which would return the indicator wheels and the other associated mechanisms to their normal inactive position.

I place a shaft 53 adjacent the column 2 of the telephone and provide guideways 54 upon the column for maintaining the shaft 53 in alignment. The shaft 53 terminates immediately beneath the hook 4, as illustrated at 55 and the depressing of the telephone hook moves the shaft against a reacting element 56. A foot 57 outwardly extends from the base of the shaft 53 that is adapted for being placed in registerable alignment with a coacting projection 58 that rearwardly extends from the yoke 46 so that the yoke 46 may be actuated with equal facility by the depressing of the button 49 or by the hanging of the telephone receiver upon the hook 4.

*Operation*

In order to more clearly set forth the sequences of operation necessary to progressively set up a series of indicia such as call numbers composed of letters and numerals, and to release the mechanism during operation or at the completion of a cycle of operation, the following mode of operation is presented.

When the frame 10 and its associated elements are in normal dormant position and the receiver is on the receiving-hook 4, the release-yoke 46 and its associated elements is out of engagement with the arms 19 and free ends 47. The pawl 35 of the first yoke, reading from left to right on Figures 10 or 11, is disposed in the first locking-surface 37. This permits the corresponding gear-wheel 33 and its corresponding gear-wheel 16 to mesh. The mechanism is now ready to be rotated clockwise for the first stage of the operating cycle. For the purposes of illustration, it is assumed that call number "Atwater 2420" is sought to be indicated and/or registered. The call letters in this instance would then be "AT". The first stage in the operating cycle would then be to indicate and/or register the letter "A". By turning the dial-face 7 clockwise until its rotation is stopped by the finger contacting the stop 8, the frame 10 and its associated elements will be rotated and, consequently, pins 30 will contact pins 40 and impart, through the interlocking of the ratchet-faces 25 and 29, rotation to the elongated-gear-wheel 32. Since all the gear-wheels 33 are at all times in mesh with elongated-gear-wheel 32, rotation will be imparted thereto. It must here be noted that prior to the beginning of the first stage of the operating cycle, the gear-wheel 33, secured to the first yoke, has been made to mesh with its respective gear-wheel 16 and, consequently, when rotation is imparted to gear-wheel 33, it will in turn impart rotation to its corresponding gear-wheel 16. Since each of the gear-wheels 16 is attached to indicia-carrying-wheels 14, the indicia-carrying-wheel 14 secured to the selected gear-wheel 16 will be rotated. The amount of rotation to be imparted to the selected indicia-carrying-wheel 14 is determined by the call letter desired to be indicated and/or registered which, in this instance, is the letter "A". As soon as the call letter is brought in view through opening 9, bell-crank 18, as indicated in Figure 9, prevents the selected indicia-carrying-wheel 14 to return to its normal dormant position until the release mechanism is brought into play.

It was pointed out heretofore that when the frame 10 and its associated elements is rotated clockwise, one of the selective-pins 38 pushes the tripping-pawl 39 aside, and thereby prevents the rotation of the selector 26. Having placed into view the call letter "A", the mechanism now is rotated counterclockwise causing the pins 30 to contact the pins 40, but the ratchet-faces 25 and 29 will not interlock and, therefore, the elongated-gear-wheel 32 will not be rotated. The rotation of the mechanism counterclockwise will also cause one of the selective-pins 38 to contact the tripping-pawl 39 with sufficient force to move selector 36; so that the pawl of the first yoke will be removed from the first locking-surface and the pawl of the second yoke will enter into the second locking-surface. In this manner, the first gear-wheel 33 is forced out of engagement with its corresponding gear-wheel 16 and the second gear-wheel 33, secured to the second yoke 31, is made to mesh with its corresponding gear-wheel 16. The mechanism is now ready for the second stage in the operating cycle.

By rotating the dial-face 7 the distance necessary to set up the call letter "T", the various gears will impart rotation to each other in the manner heretofore described, so that the call letter "T" will come into view through opening 9. The call numbers "2420" can be set up in the same manner as heretofore described.

Under normal conditions, there will be six stages in the operating cycle, but an error might be made during any one of the stages in the operating cycle. If an error is made, the indicia indicating and registering mechanism can be readily placed in position to again start with the first stage of the operating cycle by pushing button 49 downwardly so that the yoke 46 would disengage the bell-cranks 18 from the indicia-carrying-wheels 14 and, at the same time, the arm 46B will disengage the pawls 35 from the locking-surfaces 37 disposed on selector 36. Upon the disengagement of the bell-cranks 18 from the indicia-carrying-wheels 14 and the pawls 35 from the selector 36, the indicia-carrying-wheels will return to their normal dormant position because of the reacting element secured thereto, and the selector 36 will return to its normal dormant position because of the reacting element attached thereto.

If all of the stages in the operating cycle are completed and it is desired to release the indicia-carrying-wheels after the completion of a call, the button 49 may be pressed as heretofore related or the telephone receiver may be placed on receiving-hook 4 causing the vertical-rod to move downwardly, so that pressure is applied to projection 57 by foot 58.

I claim:

1. In a device of the class described, in combination with an automatic telephone having a dial rotatably mounted thereupon, a call number indicating and registering mechanism attached to the dial-shaft of said telephone, said mechanism being adapted to bring into view the call number as it is dialed including, means for automatically progressing indicia-carrying-members of the mechanism, means for retaining in view the call number dialed, and manually operable means for releasing the indicia-carrying-members while a connection is being maintained or whenever desired.

2. In a device of the class described, in combination with an automatic telephone having a dial rotatably mounted thereupon, a call number indicating and registering mechanism attached to the dial shaft of said telephone, said mechanism being adapted to bring into view the call number as it is dialed including, means for automatically progressing the indicia carrying members of the mechanism, said means including a selector having as many locking-surfaces spirally disposed thereon equidistant from each other as there are indicia carrying members, means for retaining in view the call number dialed, and manually operable means for releasing the indicia carrying members while a connection is being maintained or whenever desired.

3. In a device of the class described, in combination with an automatic telephone having a dial rotatably mounted thereupon, a call number indicating and registering mechanism attached to the dial shaft of said telephone, said mechanism being adapted to bring into view the call number as it is dialed including, means for automatically progressing the indicia carrying members of the mechanism, said means including a selector having as many locking-surfaces spirally disposed thereon equidistant from each other as there are indicia carrying members, an elongated gear wheel associated therewith, and a plurality of yokes freely mounted about the gear wheel, there being as many yokes as there are locking-surfaces and each of said yokes adapted to lockably engage with its corresponding locking-surface, means for retaining in view the call number dialed and manually operable means for releasing the indicia carrying members while a connection is being maintained or whenever desired.

4. In a device of the class described, in combination with an automatic telephone having a dial rotatably mounted thereupon, a call number indicating and registering mechanism attached to the dial shaft of said telephone, said mechanism being adapted to bring into view the call number as it is dialed including, means for automatically progressing the indicia carrying members of the mechanism, means for retaining in view the call number dialed including, gear wheels secured to the indicia carrying-members, and a plurality of bell cranks that intimately engage said gear wheels, and manually operable means for releasing the indicia carrying members while a connection is being maintained or whenever desired.

5. In a device of the class described, in combination with an automatic telephone having a dial rotatably mounted thereupon, a call number indicating and registering mechanism attached to the dial shaft of said telephone, said mechanism being adapted to bring into view the call number as it is dialed including, means for automatically progressing the indicia carrying members of the mechanism, means for retaining in view the call number dialed including, gear wheels secured to the indicia carrying members, and a plurality of bell cranks that intimately engage said gear wheels, and manually operable means for releasing the indicia carrying members while a connection is being maintained or whenever desired, said means including a release yoke having a push button extending through the dial and being adapted to contact the bell cranks to thereby disengage said bell cranks from the indicia carrying members when downward pressure is applied to the push button.

6. In a device of the class described, in combination with an automatic telephone, a housing attachable to the base of said telephone, a frame secured to the dial-shaft of said telephone, means for indicating and registering a call number as it is dialed, said means including indicia-carrying-wheels, means for locking the indicia-carrying-wheels when they reach their desired position or rotation, to thereby maintain in view the call number dialed, reacting elements for returning the indicia-carrying-wheels to normal dormant position when they are released, and means for releasing the indicia-carrying-wheels while a connection is being maintained or at any time desired.

7. In a device of the class described, in combination with the dialing mechanism of a telephone, a housing secured to said dialing mechanism, a frame secured to the dial-shaft of said mechanism, means for progressively indicating and registering a call number as it is dialed, said means including indicia-carrying-wheels, means for locking the indicia-carrying-wheels after each of said wheels is rotated to the desired position, means for returning the indicia-carrying-wheels to their normal dormant position when they are released, and means for releasing the indicia-carrying-wheels while a connection is being maintained or at the completion of the dialing cycle.

8. In a device of the class described, in combination with an automatic telephone, a number calling dial adapted for being manually rotated, indicating and registering members associated with the dial, said members adapted for automatically indicating and registering the call number as it is dialed by the rotation of said dial, and means for returning the indicating and registering members to their normal dormant position, said means including a push button extending upwardly through the dial.

9. In a device of the class described, in combination with an automatic telephone, a housing, a frame secured to the dial-shaft of said telephone, indicia-carrying-wheels rotatably disposed within the frame, means secured to the frame for progressively rotating the indicia-carrying-wheels, means secured to the housing for rotating the first mentioned means, means for retaining each of the indicia-carrying-wheels after its rotation, and means for releasing the indicia-carrying-wheels during a connection or after the calling cycle.

10. In a device of the class described, in combination with an automatic telephone, a housing, a frame secured to the dial shaft of said telephone, indicia carrying wheels rotatably disposed within the frame, means secured to the frame for progressively rotating the indicia carrying wheels, means secured to the housing for rotating the first mentioned means including a plurality of pins extending inwardly from said housing and a plurality of pins extending from the first mentioned means, means for retaining each of the indicia carrying wheels after its rotation, and means for releasing the indicia carrying wheels during a connection or after the calling cycle.

11. In a device of the class described, in combination with an automatic telephone, a housing secured to the base of said telephone, a frame secured to the dial-shaft of said telephone, indicating and registering mechanism associated with the housing and the frame, means for transferring rotational movement from the dial-shaft to the indicating and registering mechanism, and means associated with the indicating and registering mechanism for returning the said mechanism to its starting position while a call is maintained.

12. In a device of the class described, in combination with an automatic telephone, a housing secured to the base of the telephone, a frame secured to the dial-shaft of said telephone, means associated with the housing and frame for indicating and registering the call number as it is dialed, and means associated with the first mentioned means for clearing the dialed number while a connection is being maintained or at the end of the dialing.

13. In combination with the dialing mechanism of an automatic telephone, a device to register the number called, comprising a housing mounted upon the base of the dialing mechanism, a frame mounted upon the dial-shaft of the dialing mechanism, a shaft journaled within the frame, a plurality of independently rotatably indicia-carrying-wheels disposed about said shaft, an equal number of gear-wheels disposed upon said shaft, each fixedly attached to its corresponding indicia-carrying-wheel, means for maintaining the indicia-carrying-wheels in position after being rotated, a plurality of reacting members disposed about said shaft adapted to return the indicia-carrying-wheels to normal dormant position after they have been rotated therefrom, another shaft journaled within the frame, an elongated-gear-wheel disposed about said shaft, a plurality of yokes freely mounted about said elongated-gear-wheel, a pawl disposed near one end of each yoke, an idler-gear-wheel rotatably supported at the other end of each yoke, said idler-gear-wheels being in mesh with said elongated-gear-wheel, means for permitting the movement of the yokes in order to permit the idler-gears to mesh with its corresponding gear-wheel attached to the indicia-carrying-wheels, a plurality of pins extending inwardly from the housing, means associated with the second shaft adapted to coact with said pins when the frame is rotated, and means for disengaging the pawls and releasing the indicia-carrying-wheels from rotated position.

14. In combination with an automatic telephone, apparatus for indicating and registering the call number dialed including, a housing, a frame secured to the dial-shaft of the telephone, a shaft journaled within the frame, means associated with the shaft to visibly indicate and register the degree of rotation of the frame on successive dialing operations, reacting means disposed about the shaft adapted to return said first mentioned means to normal dormant position, pins extending inwardly from the housing, a selector journaled to the frame, means for moving the selector, another shaft journaled within the frame, an elongated-gear-wheel mounted thereon, means for transmitting rotary motion from the second shaft to the indicating and registering means, means for preventing the transmission of rotary motion to some of the members of the indicating and registering means, and manual means permitting the indicating and registering means and the selector to return to their normal dormant position at any time desired.

15. A device of the class described, comprising a dial for manual rotation, a frame associated with said dial, a plurality of indicia-carrying-wheels mounted within said frame, associated elements for setting the indicia-carrying-wheels one at a time and for visibly registering the amount of rotation imparted to said dial, means for locking the indicia-carrying-wheels in set position, and means for returning the indicia-carrying-wheels to their normal dormant position while a connection is maintained or at any time desired.

16. In a device of the class described, in combination with an automatic telephone, a housing secured to the base of the telephone, a frame secured to the dial-shaft of said telephone, indicia-carrying-wheels rotatably disposed within the frame, means for progressively rotating the indicia-carrying-wheels one at a time in clockwise direction, means for locking each of the indicia-carrying-wheels when it reaches its selected position, means for transferring rotational movement from the dial-shaft to the indicia-carrying-wheels, means for progressively selecting the indicia-carrying-wheel desired to be rotated, and manually operable means for returning the indicia-carrying-wheels to their normal dormant position while a connection is maintained or when desired.

17. In a device of the class described, in combination with impulse-transmitting-mechanism, a base, impulse-transmitting-mechanism disposed therein, a frame secured to said impulse-transmitting-mechanism, a dial secured to said frame, indicia indicating members mounted within said frame against the action of coil-springs, means for transmitting rotation from the impulse-transmitting-mechanism to the indicia-carrying-members upon the rotation of said dial, means for maintaining said indicia-carrying-members in their selected positions, and means for releasing said indicia-carrying-members to permit their return to their normal dormant position under the influence of said coil-springs at any time desired.

18. Apparatus as characterized in claim 17 including a housing mounted upon the base, said housing having a plurality of pins extending inwardly, a shaft journaled within the frame, means associated with said shaft permitting said shaft to be rotated by said means contacting said pins when said dial is rotated clockwise.

19. An indicia indicating and registering mechanism comprising a base, a dial-shaft extending therefrom, a housing disposed upon the base, a frame secured to the dial-shaft, a dial secured to the frame, indicia-carrying-members rotatably disposed within the frame, reacting elements secured to said indicia-carrying-members, gear-wheels secured to said indicia-carrying-members, a shaft journaled within the frame in spaced relation to said indicia-carrying-members, an elongated-gear-wheel mounted thereon, a hub, having a ratchet-face, is fixedly secured to said shaft, a sleeve, having a ratchet-face, is rotatably disposed about said shaft, said hub and sleeve are positioned about said shaft so that their respective ratchet-faces will engage with each other, a plurality of pins extending outwardly from the sleeve, a plurality of pins extending inwardly from the housing, said pins being adapted to coact with the pins extending from the sleeve when the dial is rotated clockwise, a selector journaled within the frame in spaced relationship with the shaft, said selector having a plurality of locking-surfaces spirally disposed thereon equidistant from each other, a plurality of selective-pins extending outwardly at one side of the selector, means secured to the base adapted to coact with said selective-pins upon the rotation of the dial, a plurality of yokes mounted upon the elongated-gear-wheel, an idler-gear-wheel journaled to each of said yokes, each of said idler-gear-wheels being in mesh with the elongated-gear-wheel, means disposed upon each of the yokes for coacting with the selector in order to permit the meshing of the idler-gear-wheels with the gear-wheels secured to the indicia-carrying-members, means for retaining the indicia-carrying-members in their selected position after rotation, and means for releasing the indicia-carrying-members when desired.

20. Apparatus as characterized in claim 19 wherein the means that coact with the selective-pins includes a tripping-pawl, said tripping-pawl adapted to coact with said selective-pins in order to move the selector and thereby bring each of the yokes into engagement with one of the locking-surfaces on successive rotation of the dial.

WILLIAM GREENBERG.